United States Patent [19]
De Kinkelder

[11] 3,708,126
[45] Jan. 2, 1973

[54] FLARING SPRAY NOZZLE

[76] Inventor: Petrus Johannes Alloysius De Kinkelder, 42 Zuiderlaan, Zevenaar, Netherlands

[22] Filed: Feb. 12, 1971

[21] Appl. No.: 114,851

[52] U.S. Cl. .................239/590.5, 239/78, 239/595, 285/184
[51] Int. Cl. ............................................A01b 17/08
[58] Field of Search.........239/DIG. 21, 77, 78, 552, 239/553.5, 590.5, 595, 654, 655, 513, 587, 505; 98/40; 285/184, 185, 283

[56] References Cited

UNITED STATES PATENTS

| | | | |
|---|---|---|---|
| 3,586,237 | 6/1971 | Taylor | 239/78 |
| 3,552,045 | 1/1971 | Fieber | 285/185 X |
| 2,620,230 | 12/1952 | Hait | 239/78 |
| 840,603 | 1/1907 | Bodvig | 285/184 X |
| 3,015,188 | 1/1962 | Reinecker et al. | 239/654 X |
| 3,329,322 | 7/1967 | Herd | 239/655 X |
| 3,504,854 | 4/1970 | De Kinkelder | 239/78 |
| 791,397 | 5/1905 | Asbury | 285/184 X |
| 2,079,063 | 5/1937 | Brosius | 285/184 X |

Primary Examiner—M. Henson Wood, Jr.
Assistant Examiner—Michael Y. Mar
Attorney—Sughrue, Rothwell, Mion, Zinn & Macpeak

[57] ABSTRACT

A spray head having three flaring discharging nozzles is provided to ensure total spray coverage on the front and sides of a spray apparatus. The nozzles are adjustable to alter the spray pattern and can be maintained by fasteners at any position desirable. Gas baffle guides are attached to the nozzles and extend into discharge stubs to assist the flow pattern.

8 Claims, 5 Drawing Figures

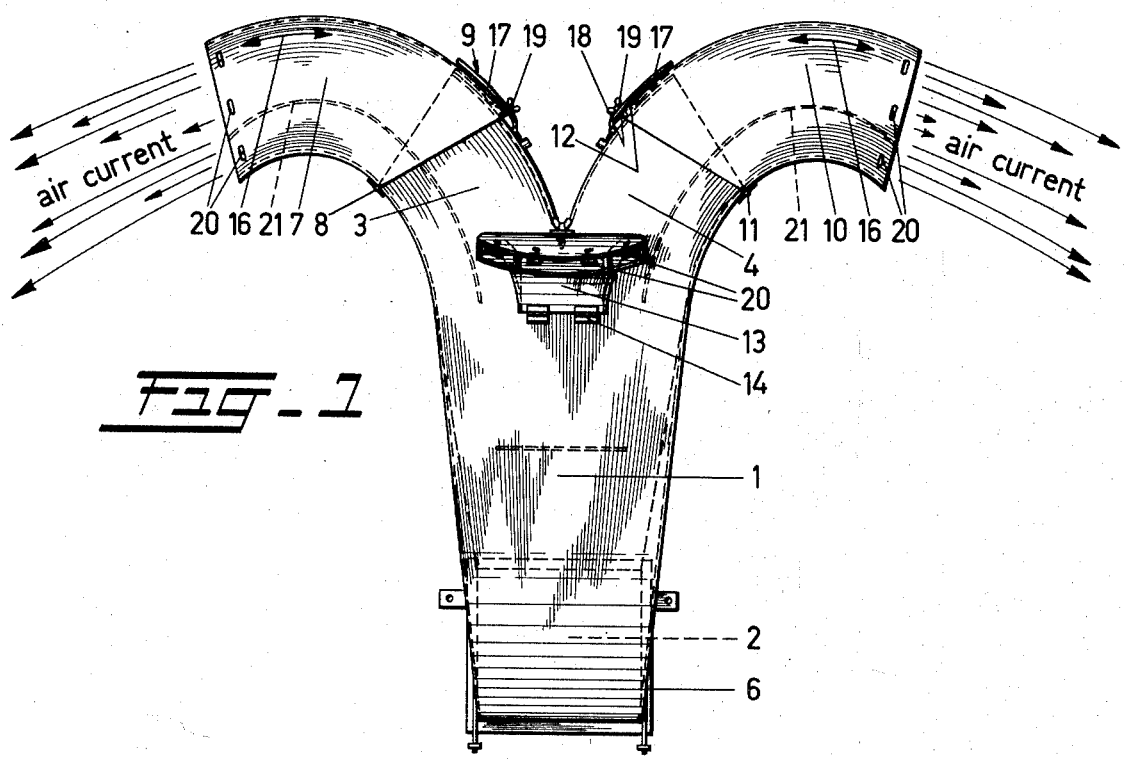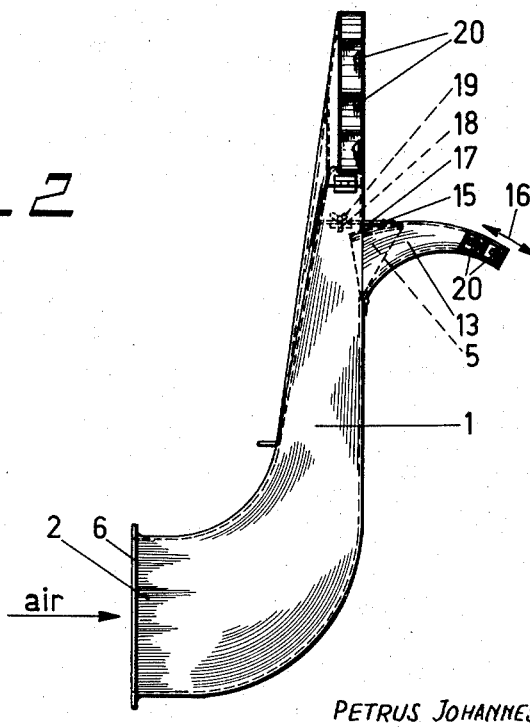

FLARING SPRAY NOZZLE

FIELD OF THE INVENTION

The invention relates to a spray head for a liquid sprayer for spraying liquids, such as insecticides, fungicides, fertilizers and the like on trees and plants and may be particularly adapted for use in orchard and row crop spraying.

In a liquid sprayer of the above mentioned kind, a spray head is connected to an air blower and the spray liquid is delivered from a tank to a plurality of low pressure spray liquid outlets being mounted along the flaring edges of the spray head.

BACKGROUND OF THE INVENTION

Attempts have been made throughout the years to obtain an optimum spray pattern. As an example a spray head is used in which the head includes a pair of outwardly flaring spray mouth nozzles each subtending an angle of approximately 90°. One nozzle extends beyond the other in a direction perpendicular to the plane of nozzles and both nozzles are rotatably connected to the blower outlet thereby permitting adjustable combinations of coverage between 90° and 180°. Reference is made to my U.S. Pat. No. 3,504,854 filed May 1, 1968 and granted Apr. 7, 1970 for an example of such a sprayer. However, the known spray head has a disadvantage in that the sector in front of the spraying apparatus is not sprayed.

SUMMARY OF THE INVENTION

It is accordingly an object of the present invention to provide a new and improved spray head particularly, though not exclusively, adapted for use in orchard and row crop spraying and which shall not be subject to the above described limitation, but, to the contrary, unlike prior art spray heads, produces an optimum spray in front of the spraying apparatus.

A further object is to provide a new and improved spray head of more general utility.

Other and further objects will be described hereinafter and are more particularly delineated in the appended claims. In summary, however, the invention contemplates a spray head for a sprayer for spraying liquids, such as insecticides, fungicides, fertilizers and the like on trees and plants for use in orchard and row crop spraying comprising a branch pipe having one supply aperture and three flaring discharge stubs.

In using the spray head according to the invention, a spray pattern is generated comprising two strip-like parts on either side of the spray apparatus running perpendicular to the direction of travel of the spray apparatus. This spray pattern is accomplished by providing two flaring discharge stubs which are directed nearly opposite to each other, lying broadly in the same plane, e.g., a plane perpendicular to the riding direction. The spray pattern further consists of a spray sector in front of the spray apparatus. This forward spray sector is produced by a third flaring discharge stub that is positioned in a plane nearly perpendicular to the first mentioned plane.

For the purpose of regulating or adjusting the sprayed area, each discharge stub has been provided with an adjustable nozzle.

In a preferred embodiment, each nozzle is connected to the relative discharge stub by means of a fixed hinge at one side and an overlap at the other side. By pushing in or pushing out the nozzles, the area of spray can be decreased or increased. Preferably, the nozzles are designed to complement each other so that the individual spray areas connect to provide full coverage without any gaps.

In each nozzle connection, the side opposite the hinge is provided with cooperating means at the nozzle and the relative stub for fixing the nozzle in an adjusted position. The spray head of this invention is particularly suitable for spraying low harvests or crops.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings in which:

FIG. 1 is a view of the spray head according to the invention;

FIG. 2 is a sectional view of the spray head according to the invention;

DESCRIPTION OF THE PREFERRED EMBODIMENT

According to the FIGS. 1 and 2, the spray head of the invention comprises a branch pipe 1 having one supply aperture 2 and three flaring discharge stubs 3, 4 and 5. In the usual way the branch pipe 1 is connected with its aperture 2 to the compressed air ventilator (not shown) of the spraying apparatus by means of a flange 6.

Figure 5:
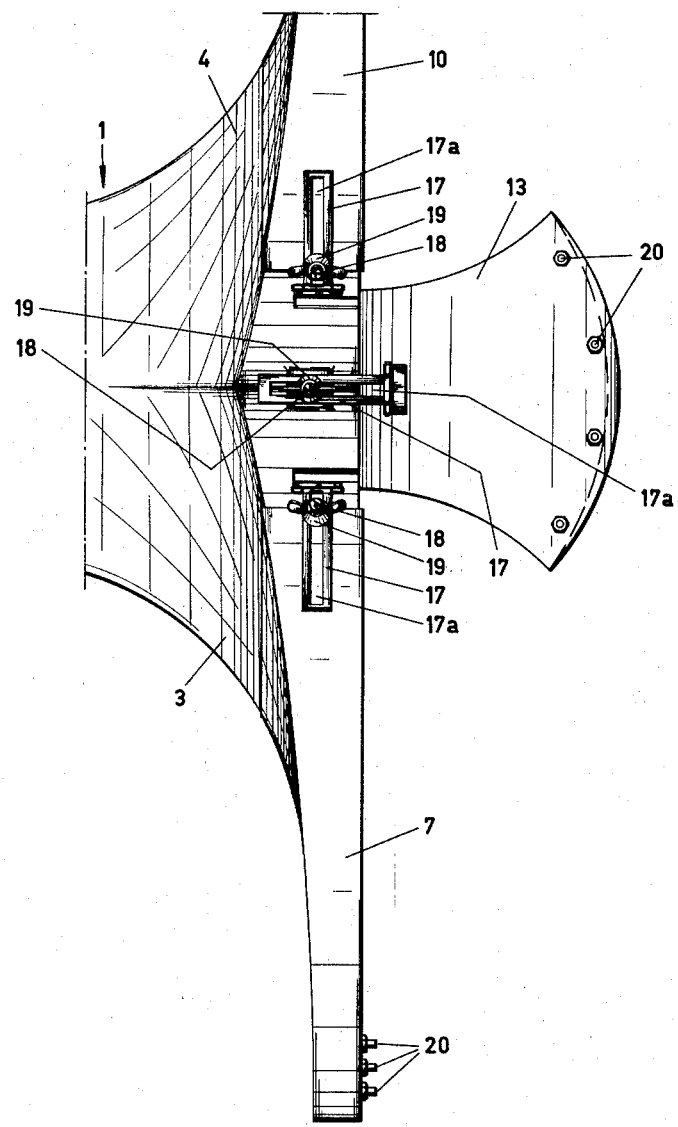
FIG. 5 is a top plan view of the spray head.

Each discharge stub is provided with an adjustable nozzle in such a manner that each nozzle is connected to its relative stub by means of a fixed hinge at one side and an overlap at the other side. A nozzle 7 is hinged at 8 to stub 3 in such a manner that they overlap each other at 9. A nozzle 10 is hinged at 11 to stub 4 in such a manner that they overlap each other at 12. A nozzle 13 is hinged at 14 to stub 5 in such a manner that they overlap each other at 15. Each nozzle can be pushed in and out in the direction of arrow 16 in FIG. 2 over an angle being bounded by a continuous line and a dotted line running from the relative hinge 8, 11 and 14. Each nozzle can be secured in a predetermined position, even in an intermediate position by a suitable fastening means as shown in FIG. 5. In the disclosed preferred embodiment, the fastening means of FIG. 5 consists of a bow 17 including an oblong slot 17a and a screw bolt 18 being secured to the nozzle and extending through the slot 17a; the free end of the bolt 18 is provided with a winged nut 19.

Figure 3:
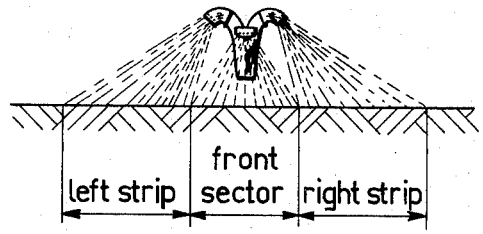
FIGS. 3 and 4 show the effect being obtained by the adjustable nozzles.
Figure 4:
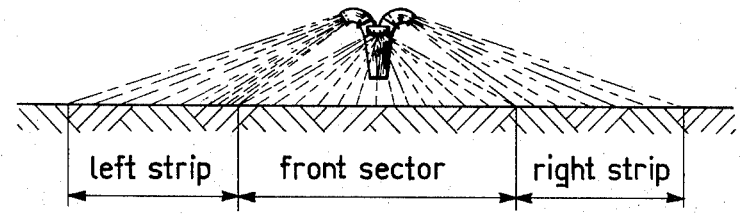

The effect that can be obtained by the adjustable nozzles has been shown in FIGS. 3 and 4. FIG. 4 shows the spray effect with a spray head in which the nozzles are in their pushed in position and FIG. 3 shows the spray effect with the same spray head in which the nozzles are in their pushed out position.

It will be evident to those skilled in the art that each nozzle can be provided with a plurality of spray liquid outlets 20 being known per se from my U.S. Pat. No. 3,504,854 filed May 1, 1968 and granted Apr. 7, 1970. The port outlets 20 on the spray nozzle 7 are adapted to receive the spray liquid. Further, each nozzle may be equipped with one or more air guiding baffles 21, each being fixed to the inner wall of the nozzle and extending through at least a portion of the relative stub, the air guiding baffles 21 helping to direct the spray fluid through an angle exceeding 90° and cooperating with the spray liquid to insure a satisfactory discharge.

While the invention has been particularly shown and described with reference to a preferred embodiment thereof, it will be understood by those skilled in the art that various changes in form and details may be made therein without departing from the spirit and scope of the invention.

What is claimed is:

1. A spray head for spraying apparatus comprising a branch pipe having a supply aperture at one end adapted to be connected to a source of compressed gas, three flaring discharge stubs and nozzles connected to each discharge stub, the nozzles adapted to be connected to a source of spray liquid, two of the flaring discharge stubs being directed approximately 180° from each other and lying in the same plane, the third flaring discharge stub being positioned in a plane generally perpendicular to the plane of said two discharge stubs, said third flaring discharge stub forming a generally horizontal spray pattern which is generally perpendicular to the plane of said two flaring discharge stubs.

2. A spray head according to claim 1 where the nozzle connected to each discharge stub is adjustable.

3. A spray head according to claim 2 where the nozzle is connected to each discharge stub by a hinge at one side and overlaps the discharge stub at the other side.

4. A spray head according to claim 3 wherein fastening means including a bow having a slot is provided on each nozzle.

5. A spray head according to claim 3 wherein gas guide means are provided on the interior of each stub.

6. A spray head according to claim 4, wherein curved gas guide means are provided on the interior of each stub to direct the spray fluid along a curved path terminating at least 90° from the entrance of the air guide means.

7. A spray head according to claim 5 wherein the gas guide means include gas baffles fixed to the nozzle and extending into the discharge stubs.

8. A spray head according to claim 1, wherein the nozzle of said two flaring discharge stubs lying in the same plane form spray patterns in a generally vertical plane.

* * * * *